E. N. WHITE.
METHOD AND MEANS OF MAKING PANORAMIC PHOTOGRAPHS.
APPLICATION FILED APR. 16, 1908.
928,724.
Patented July 20, 1909.
2 SHEETS—SHEET 1.
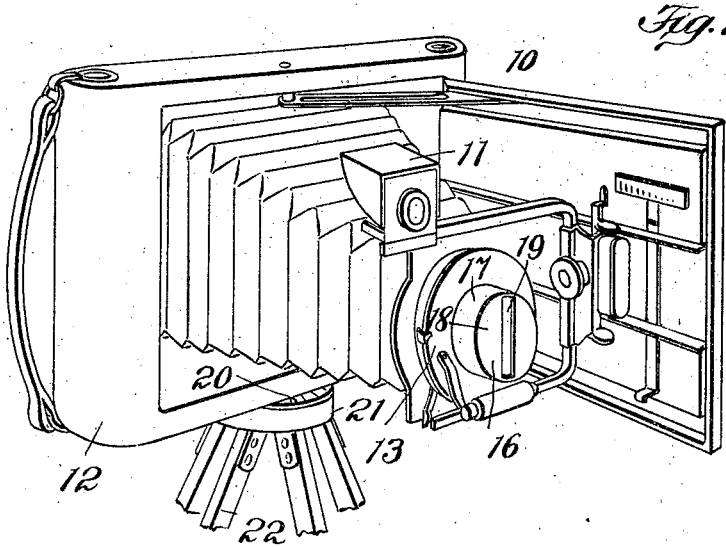
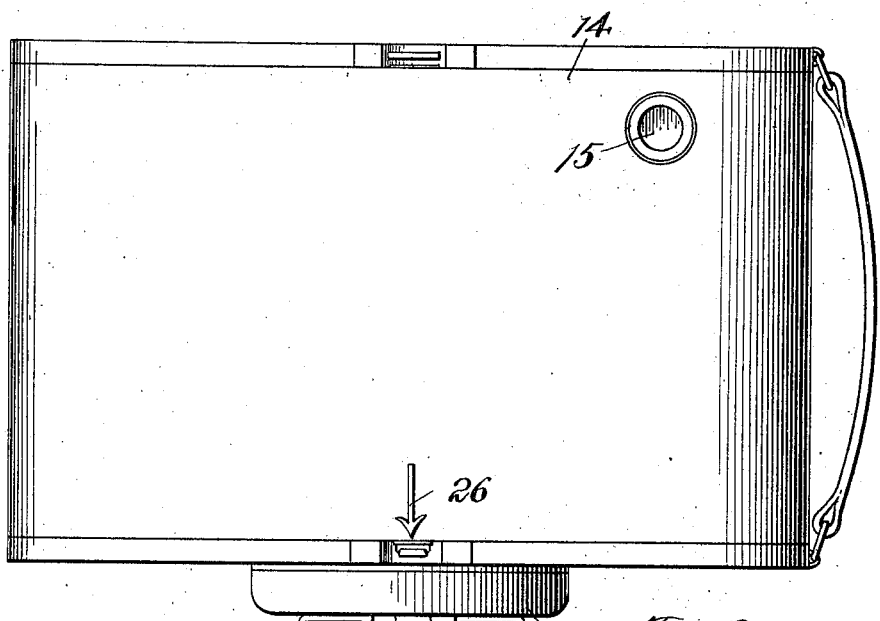

E. N. WHITE.
METHOD AND MEANS OF MAKING PANORAMIC PHOTOGRAPHS.
APPLICATION FILED APR. 16, 1908.
928,724.
Patented July 20, 1909.
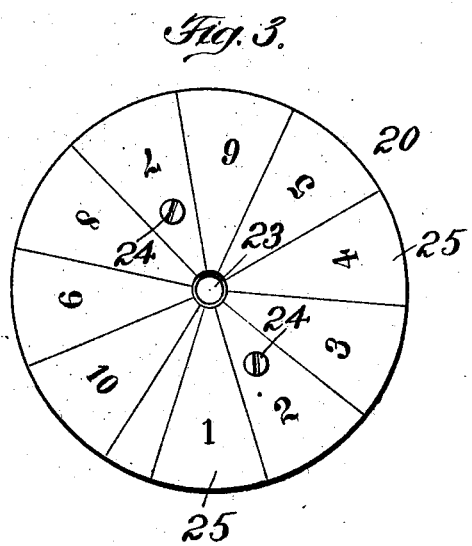
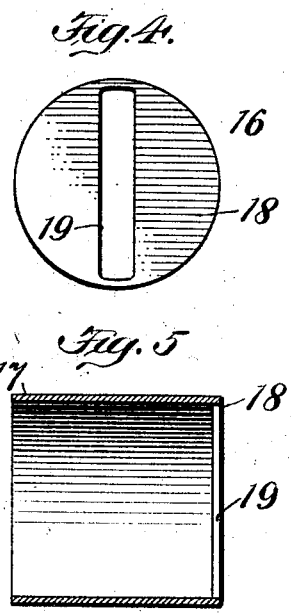
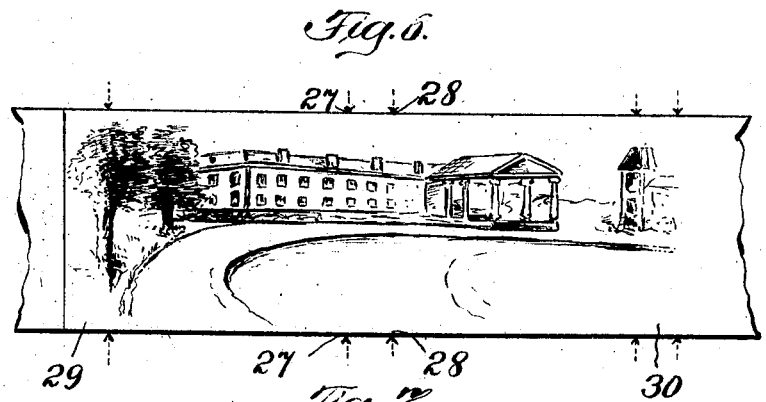
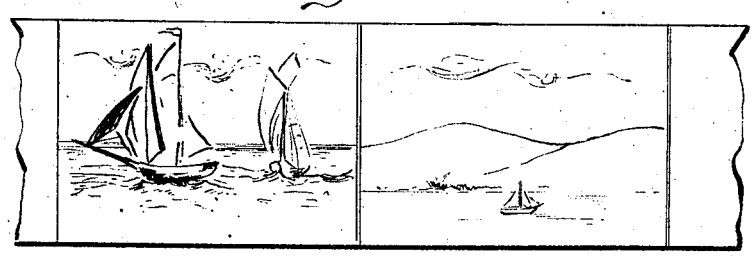
WITNESSES
INVENTOR
Edward N. White
BY
Criswell & Criswell
ATTORNEYS

UNITED STATES PATENT OFFICE.

EDWARD N. WHITE, OF HOLQUIN, CUBA.

METHOD AND MEANS OF MAKING PANORAMIC PHOTOGRAPHS.

No. 928,724.  Specification of Letters Patent.  Patented July 20, 1909.

Application filed April 16, 1908. Serial No. 427,355.

*To all whom it may concern:*

Be it known that I, EDWARD N. WHITE, a citizen of the United States, and a resident of Holquin, Republic of Cuba, have invented certain new and useful Improvements in Methods and Means for Making Panoramic Photographs, of which the following is a full, clear, and exact description.

This invention relates more particularly to making panoramic pictures on a web-like body by the ordinary camera.

The primary object of the invention is to provide a method and means whereby the ordinary film camera or camera using a roll, regardless of size, style or make, may be utilized to take an extended or panoramic view, or a series or succession of pictures, or exposures so produced that no line of distinction between the views is apparent; to provide a method in which the pictures produced will not be distorted and are much better than the negatives made with the usual swinging lens camera; and to provide means whereby cameras are adapted to produce with equal facility either panoramic or ordinary work.

Another object of the invention is to provide a method in which enlarged positives from panoramic negatives may be produced, or a succession of photograph or other views representing different positions of the same or different objects may be so blended together that there will be no line of distinction between the successive pictures, in order that the entire negative or picture may have an appearance as if taken by a single exposure.

Further objects of the invention are to provide simple and efficient means which may be applied to various forms and styles of cameras so as to adapt the camera as ordinarily constructed and without change to take panoramic views or a succession of pictures in which the pictures are so blended as to form a continuous whole, and to so construct the means provided that it may be quickly removed to adapt the camera for ordinary work.

With these and other objects in view the invention will be hereinafter more particularly described with reference to the accompanying drawings, which form a part of this specification, and will then be pointed out in the claims at the end of the description.

In the drawings, Figure 1 is a perspective view of one form of camera with my invention applied thereto. Fig. 2 is a rear view of the camera shown in Fig. 1. Fig. 3 is a detail view of a dial used to indicate the extent of movement of the camera at each exposure. Fig. 4 is a front view of the blender or device which causes the successive views to merge or blend at their point of joining. Fig. 5 is a vertical section of the blender shown in Fig. 4. Fig. 6 is a view showing the first and second exposures, illustrating how one exposure blends or merges into the other; and Fig. 7 shows how a succession of views would appear if taken without the blender, and in which each view is entirely distinct from the one next adjacent.

In carrying my invention into effect I may employ the ordinary camera, and I arrange a device which I term a blender which cuts off a part of each exposure at each end thereof, so as to gradually decrease from a full exposure to nothing at each end, and each picture or exposure is made to overlap the next preceding one at its ends, and the overlapped portion of one exposure is such that it will compensate for the lack of exposure of the next one, so that when two succeeding exposures have taken place the results of the two exposures at the overlapped portion are completely blended or merged one into the other and the succeeding views or exposures will make a single and continuous photograph. The picture may be made without moving the camera and lens; or the camera may be moved to take a succession of views each different from the other, and in this case means is provided whereby the camera may be moved the proper distance so that the succeeding pictures will overlap the desired extent.

The camera 10 is of the ordinary folding type known as the "kodak" and has the usual finder 11, folding casing 12, and movable lens holder 13, and on the back 14, of the camera is the usual red glass 15, through which the marks may be seen which indicate the proper distance the film should be moved at each exposure. On the lens holder and in front of the same is a device or blender 16. This blender may be of any desired form or construction and of any suitable material. As shown it is cap-like in form, and has a cylindrical body portion 17 provided with a front disk-like face 18 in which is arranged a slot 19. This slot 19 extends vertically when the blender is in use, and by reason of the slot, the said blender or device cuts off gradually the view at both ends of each exposure, or causes the main part of the exposure to exceed that at the ends, and this exposure may be one-half at the ends what it is for the remainder of the exposure, and is due to the use of the blender. If the blender is not used a sharp line is produced between each exposure, which would be impossible to blend properly, but with the use of the blender the exposure gradually diminishes at each end until it runs into nothing. If for example seven inches of film is used for each exposure the center of each exposure would be full timed, but about one inch on each end is half timed. The second exposure, which overlaps the preceding one to the extent of one inch, corresponds as to the view to the part to be blended in the preceding exposure, and said second exposure also has its ends half timed or gradually cut off, and its inner part between the ends full-timed, thus the second exposure at the overlapped ends will make the exposure equal to the other part thereby producing a full-timed negative throughout, as well as to blend one exposure into the other where they overlap. By this means the photograph is produced without lines and is absolutely continuous.

The blender can be used in the form of a cap or in any other form or style depending on the instrument on which it is used, but the method of application is substantially the same in all instances, and so long as means is provided for cutting off gradually a portion of the view at a given point, or causing the exposure at one part to exceed that of the other, and in which the succeeding exposures overlap, such means is within the scope of my invention.

The form of blender shown can be used either in front of the lens and attached to the lens or camera in any desired way, or it may be attached or arranged at the back of the lens, as between the lens and ground glass, and the size of the opening in the blender depends on the distance of the opening from the lens. If the opening is small, the blender will be placed nearer the lens, and if larger farther away, for the nearer the opening is to the lens the more it blends the picture taken. It will thus be seen that the exact distance of the blender from the lens and size of opening or slot therein will vary according to the character of the camera, although the blending may be done at any point desired within a reasonable distance from the lens.

Where a succession of views is to be taken, it is desirable that the camera be arranged so that the same may be moved a fixed distance according to the size of the pictures to be taken. If it is intended to use seven inches of film for each exposure, in that case the camera would be turned that distance each time. For this purpose I arrange a dial 20 on the head 21 of the tripod 22 which supports the camera, and this dial may be made of metal, paper, pressed board or of any suitable material, and is provided with a central opening 23, which is adapted to fit over the usual screw of the tripod to which the camera is attached. This dial or indicator may be fastened by screws 24 to the tripod head, and is provided with a series of divisions 25, which may be numbered consecutively and which are made to correspond to the distance the film is to be moved after each exposure, and the extent of view to be taken at each exposure. The dial may be made by measuring from the center of the screw to the front of the lens, and if this distance is say ten and one-half inches, a circle may be made having a diameter of twenty-one inches and then marking off the circumference of the circle in spaces of seven inches each, and drawing lines to the center. A dial of any desired size can then be made, which may be just the size of the tripod head by simply cutting out the center of the larger dial to the proper diameter. The camera is provided with an arrow or pointer 26, Fig. 2, and this pointer will indicate the exact distance the camera is moved each time along the dial. As the camera is moved for each exposure the film is correspondingly moved in the camera in the usual manner, and by reason of the blender, the successive photographs or views will have a part thereof overlapping the one next adjacent thereto, and these overlapped portions will be merged into each other as already explained.

The invention is shown as applied to what is known as a four-by-five "kodak", and in this case the paper on the back of the film may be divided off into spaces of three and three-quarter inches in length, and the dial made and indexed accordingly. The only change therefore is in the use of the dial and the blender 16, otherwise the camera is of the usual construction.

In Figs. 6 and 7, the effect of the blender and its use will be seen, and in the former figure two exposures have been made, the overlapping portion from 27 to 28 being perfectly merged or blended into the adjacent portions while the parts 29 and 30 show the ends of the exposures in which the view is gradually cut off; while if the blender is not used there is a distinctive division between the successive exposures or pictures as shown in Fig. 7.

The invention is not confined to taking panoramic negatives, but the same system of blending may be employed in connection with taking a succession of portraits or views of objects, animals, etc., in different positions and blending the spaces between them; or enlarged positives from panoramic negatives may be made in substantially the same way. In these two cases the dial need not be used, but only the blender, and if enlarged positives are to be made the enlarging camera may be provided with two roll holders, one small to carry the negative film, and the other larger to carry the sensitive paper. The film rolls in front of the lens at a given distance, depending upon the extent of the enlargement to be made, and the paper moves in the opposite direction and back of the lens, the blender being arranged between the lens and the negative, or between the lens and paper as desired. If the enlargement is to be twice the original size and the film moved seven inches for each exposure, the paper would then be moved fourteen inches for each exposure.

From the foregoing it will be seen that a simple and efficient method is provided whereby any one can take panoramic photographs without changing the camera as ordinarily made; that the camera is simple and effective in use, and produces panoramic views equal to the best; that the camera may be used for panoramic work either on the same film or on different films without any additional trouble, that by the method set forth a succession of views of the same or different objects may be made in succession and blended so as to be continuous, and that enlarged photographs may be readily made from negatives on which there is a succession of views.

Having thus described my invention, I claim as new and desire to secure by Letters Patent:—

1. In panoramic photography, the method which consists in making a succession of exposures on a sensitized body while the latter and the exposure producing means are stationary and causing the exposures to overlap, and blending the overlapped portions whereby the series will be continuous.

2. In photography, the method which consists in making a succession of independent exposures on a sensitized body while the latter is stationary and causing the exposures to overlap at their ends at the time of exposure and simultaneously blending the overlapped portions as the exposures are made.

3. In photography, the method which consists in producing a succession of pictures on a sensitized body while the latter and the picture producing means are stationary, and causing the adjacent pictures to overlap and the overlapped portions to blend as the pictures are produced whereby the lines of distinction between the successive pictures are eliminated 4. In photography, the method which consists in producing a succession of pictures on a sensitized body while the latter is stationary, and causing the pictures to overlap for a small part of their length and the overlapped portions to blend as the pictures are produced whereby the lines of distinction between the successive pictures are eliminated.

5. In photography, the method which consists in producing a plurality of pictures in succession on a sensitized body while the latter and the picture producing means are stationary, and causing the adjacent pictures to overlap and the overlapped portions to blend as the pictures are produced whereby the lines of distinction between the successive pictures are eliminated.

6. In photography, the method which consists in producing a plurality of exposures in succession and intermittently on a sensitized body while the latter and the exposure producing means are stationary and causing each exposure to overlap the one next adjacent, and blending the overlapped portions as the exposures are made.

7. In photography, the method which consists in producing a plurality of independent exposures in succession on a sensitized body while the latter and exposure producing means are stationary, and causing a part of each exposure to overlap the one next adjacent.

8. In panoramic photography, the method which consists in making a plurality of independent exposures on a stationary sensitized body each of which has one part exposed to a less degree than the other and causing the next exposure to compensate for the lack of exposure of a part of the one preceding.

9. In panoramic photography, the method which consists in making a succession of distinct and independent exposures, on a stationary sensitized body causing the exposures to overlap those adjacent thereto to a less extent than the view itself, and blending the views at their overlapped portions by exposing the overlapped portions to a less degree than the remainder whereby the succession of pictures will form a continuous whole.

10. In photography, the method which consists in moving a sensitized body intermittently and producing a succession of independent views thereon while stationary, and blending the views at their point of joining by less exposure than the remainder of the views.

11. The method which consists in moving a sensitized body intermittently and producing a succession of independent views thereon while stationary which overlap for a part of their length thereon, and blending the views at their overlapped parts by less exposure than the remainder of the views.

12. The combination with a camera having means for holding a lens, of a device fitting over the lens and covering a part of the same and adapted to cut off a part of the view at each exposure.

13. The combination with a camera having means for holding a lens, of a device fitting over the lens and covering a part of the same and adapted to cut off gradually a part of the view at each exposure.

14. The combination with a camera having a lens of a device cutting off a part of the view to be taken so as to gradually diminish in intensity at the edges only of the view.

15. The combination with a camera having a lens of a device having a vertical slot cutting off a part of the view to be taken so as to gradually diminish in intensity at its end only.

16. As an article of manufacture, a device adapted to fit over the lens of a camera and having a slot extending vertically across the same to cut off a part of the view to gradually diminish in intensity at its ends only.

17. As an article of manufacture, a device adapted to be applied to a camera and having means to cut off a part of the view to be made, and to cause a relatively large part of the view to be exposed to a greater extent than the other.

18. As an article of manufacture, a cap-like device adapted to be applied to a camera and having a slot extending across one end of the same to cut off a part of the view and to expose a relatively large part of the view to be produced to a greater extent than the other.

19. The combination with a camera and means for rotatably supporting the same, of a dial arranged to indicate various positions of the camera, and a blender adapted to gradually cut off a relatively small part of the view to be taken.

20. The combination with a camera and means for rotatably supporting the same, of a graduated dial arranged to indicate various positions of the camera, and a blender fitting over the lens and adapted to gradually cut off a relatively small part of the view to be taken.

21. The combination with a camera and means for rotatably supporting the same, of a dial having a plurality of divisions and arranged to indicate various positions of the camera, and a blender having a slot across its face and adapted to gradually cut off a part of the view to be taken so as to expose a relatively large part of the view to a greater extent than the remainder.

This specification signed and witnessed this fourth day of April A. D. 1908.

EDWARD N. WHITE.

Witnesses:
I. NEUHAUSER,
JOAQUIN PELLADO.